Patented Aug. 6, 1929.

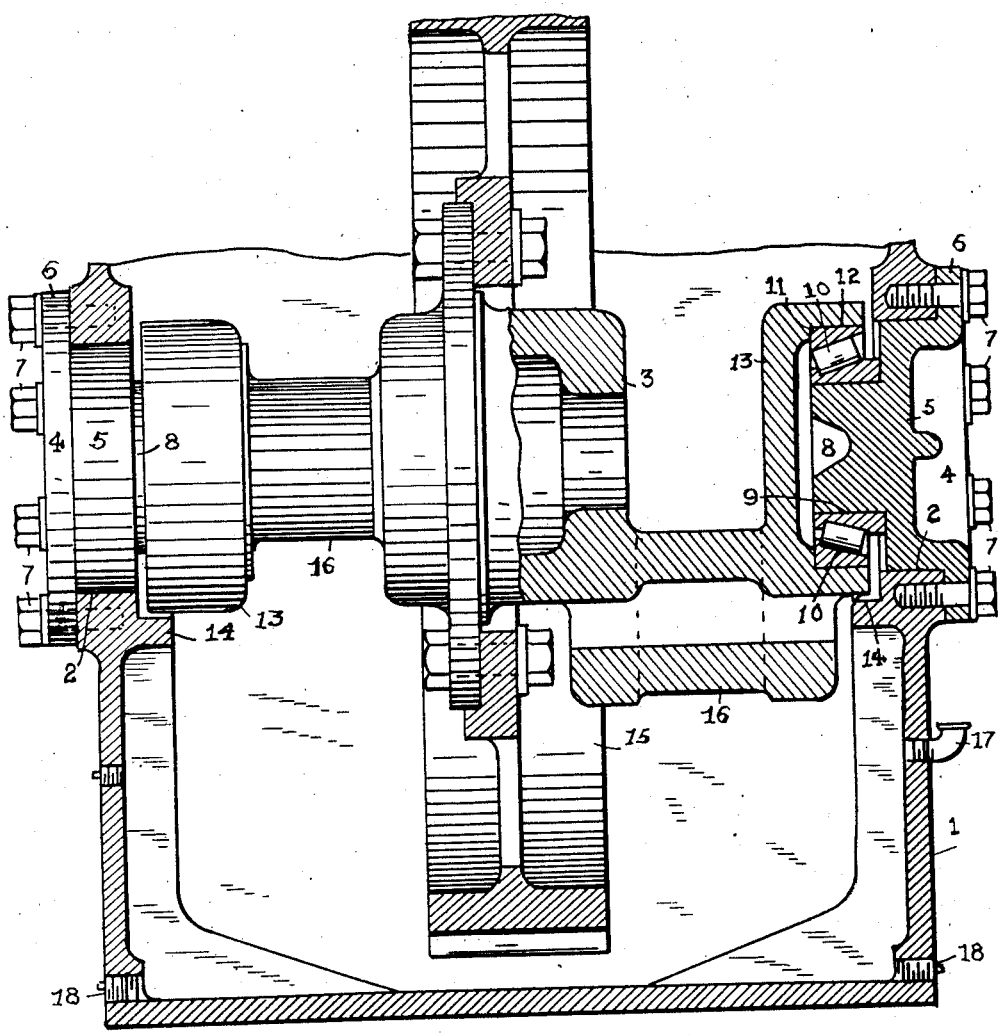

1,723,299

UNITED STATES PATENT OFFICE.

JOHN B. PICARD, OF TOLEDO, OHIO, ASSIGNOR TO THE NATIONAL SUPPLY COMPANY, OF TOLEDO, OHIO, A CORPORATION OF OHIO.

CRANK-SHAFT SUPPORT.

Application filed September 24, 1927. Serial No. 221,715.

My invention relates to supports for crank-shafts.

As crank-shaft of the type shown, which are used largely for operating pumps, are preferably operated in an oil bath, it is desirable in order to prevent the leakage of the oil that the part of the casing which contains the oil and bearings of the crank be made in one piece. In such a casing the ends which have the bearing for the crank are spaced apart a fixed distance. I desire to insert the crank-shaft downwardly between the ends of the casing and support the crank-shaft with its ends opposite holes in the casing, through which holes the fixed bearings for the ends of the crank shaft are inserted and in which they are secured.

Referring to the accompanying drawing, the figure shows the lower portion of a crank-case with the crank mounted therein, the casing being in vertical section and the crank-shaft and its bearings at the right end being in vertical section while the crank shaft and its left bearings being in side elevation.

On the drawing, 1 designates the lower portion of a casing. This portion of the casing is a one-piece casting having its ends provided with opposite openings 2. As the bearings at the ends of the crank-shaft 3 are alike, the right hand one only will be described. The opening 2 supports the fixed bearing member 4 which is composed of a body 5 fitting the opening 2, and exterior flange 6 thereon fitting against the end of the casing around the opening and secured thereto by the screws 7, the portion 8 projecting into the casing and supporting the inner race 9 for the rollers 10 which roll on the outer race 11 carried by the interior wall 12 of the cup 13 in the end of the crank-shaft 3. Directly below the cup 13 the casing has inwardly projecting ledges or saddles 14 on which the cups 13 rest when the crank-shaft has been lowered into the casing so that the open ends of the cups lie substantially in axial alinement with the openings 2. When the crank-shaft is supported on the ledges 14, the bearing members 4 may be readily applied so that the portions 8 with their races 9 and the rollers 10 will be within the cups 13, the rollers 10 engaging the races 11, as shown at the right-hand side of the drawing. In this position of the said parts the flanges 6 will fit the ends of the casing 1 and the screws 7 can be screwed through the flanges and into the casing.

The central portion of the crank-shaft has the gear 15 which may be driven from connections with a suitable prime mover, not shown. At each side of the gear 15 is a crank 16 to which a pitman, not shown, may be connected for operating a pump or other device. The casing is provided with a fitting 17 through which oil may be introduced into the casing, and with the plugs 18 which may be removed to drain the oil from the casing.

It will be noted from the drawing that the crank-shaft does not rest on the ledges 14 after the end bearings carried by the member 4 have been applied to the crank-shaft, as shown in the drawing. When the crank-shaft is on the ledges, its axial center is slightly below the axial centers of the fixed bearings when in their normal positions as shown. The distance between the said axial center of the crank-shaft and the line connecting the said axial centers of the fixed bearings is small, so that the conical end bearings when moved into their fixed places will raise and hold the crank-shaft slightly above the ledges.

I claim—

1. A casing having holes in opposite sides, a crank-shaft whose length does not exceed the distance between the opposing faces of the casing adjacent to the holes, bearing members in the ends of the crank-shaft, other bearing members insertable through the holes and into the first bearing members, means holding the second bearing members in place, and ledges below the holes and arranged to support the crank-shaft with its end bearing members substantially opposite the said holes.

2. A casing having holes in opposite sides, a crank-shaft whose length does not exceed the distance between the opposing faces of the casing adjacent to the holes, bearing members in the ends of the crank-shaft, other bearing members insertable through the holes and into the first bearing members, means holding the second bearing members in place, and means adjacent to the holes arranged to support the ends of the crank-shaft with its end bearing members substantially opposite the said holes.

3. A casing having holes in opposite sides, a crank-shaft whose length does not exceed the distance between the opposing faces of the casing adjacent to the holes, bearing members carried by the ends of the crank-shaft, other bearing members insertable through the holes and into cooperative relation with the first bearing members, means holding the second bearing members in place, and means adjacent to the holes arranged to support the ends of the crank-shaft with its end bearing members substantially opposite the said holes.

4. A casing, a crank-shaft whose length does not exceed the distance between the opposing faces of the casing, and ledges projecting inwardly from the opposing faces, said ledges being so positioned that the ends of the crank-shaft will be supported in a predetermined position.

5. A casing, a crank-shaft, bearings at each end of the casing to support said crank-shaft, whose length does not exceed the distance between the opposing faces at said casing, and ledges projecting inwardly from the opposing faces and positioned to support the crank-shaft approximately in line with said bearings.

6. A casing, a bearing at each end of the casing, a shaft adapted to be journaled in said bearings, said shaft being of a length not to exceed the distance between the inner end faces of the casing, and a ledge projecting inwardly from each of the inner end faces and positioned to support the crank-shaft in approximate alignment with said bearings.

In testimony whereof, I hereunto affix my signature.

JOHN B. PICARD.